United States Patent [19]

Feldcamp

[11] 3,768,344

[45] Oct. 30, 1973

[54] MANUFACTURE OF EXTRUSION TOOLS
[76] Inventor: Edward George Feldcamp, Tudor Cottage Church End, Twyning, Tewkesbury, England
[22] Filed: Nov. 8, 1971
[21] Appl. No.: 196,467

[52] U.S. Cl................................................ 76/107 R
[51] Int. Cl............................................... B21k 5/20
[58] Field of Search...................... 76/107 R, 107 A, 76/107 S, 107 C; 51/317, 318, 290, 394

[56] References Cited
UNITED STATES PATENTS
3,190,107   6/1965   Slifka et al......................... 76/107 S
3,521,412   7/1970   McCarty................................. 51/317

*Primary Examiner*—Leonidas Vlachos
*Attorney*—Irvin S. Thompson et al.

[57] ABSTRACT

A method of manufacturing extrusion dies or "tools" produces a tool with an accurately and well-finished tool opening in an economic manner which allows relatively unskilled labour to be employed.

In the method of spark-erosion electrode is formed by machining an electrode blank to a profile complementary to the desired tool aperture, such machining employing a cutting tool which during the machining operation traverses in the general plane of the electrode, that is at right-angles to the direction in which the electrode enters the extrusion tool blank during a subsequent spark-erosion step to produce an apertured tool blank. The side wall of the aperture is thereafter finished by forcing an abrasive compound through the tool. The abrasive compound is preferably a solid wax containing abrasive particles, and heat treatment of the tool blank may be effected before abrasion or between separate abrading steps.

The method is of particular application to the manufacture of tools for extruding aluminium sections.

14 Claims, No Drawings

MANUFACTURE OF EXTRUSION TOOLS

BACKGROUND OF THE INVENTION

This invention relates to the manufacture of extrusion dies or "tools" as used, for example, in the extrusion of aluminium sections. It relates to methods of manufacturing such tools, and the resultant tools, and is also of general application to the manufacture of comparable apertured metal components.

The invention will hereinafter be described solely with reference to "extrusion tools," which terminology is to be construed as including also apertured metal components which are comparable, in the sense that they can be manufactured by the method of the invention.

At present an extrusion tool is normally preformed by spark erosion, employing a spark erosion electrode which is hand-made, in the sense that hand workmanship is employed although power-driven reciprocatory files are commonly used. After heat treatment to provide the appropriate hardness for the extrusion tool the wall of the spark eroded opening is finished, again by hand, using small hand files and emery cloth to provide a satisfactory surface finish. This removes the "etched" surface left by the spark erosion process, but it requires considerable skill and care if the shape of the opening is to be maintained and the die performance not affected due to an adverse slope being given to various portions of the aperture side wall.

The production of the electrode, involving as it does tool movement at right-angles to the plane of the electrodes, i.e., in the direction in which the electrode enters the tool blank during spark erosion, however skilled the operator inevitably results in tool marks on the electrode which are reproduced in the eroded opening. The accuracy of the electrode profile is also limited to that obtainable by hand-production methods and essentially relies on operator skill. During the final finishing the cutting movements, either by file or emery cloth, are again in the same general direction, and whether or not the electrode imperfections are removed additional imperfections running through the tool opening can be and almost inevitably are produced, and they can only be kept within acceptable limits by employing highly skilled labour.

SUMMARY OF THE INVENTION

According to the invention a method of manufacturing an extrusion tool comprises the steps of forming a spark erosion electrode by machining an electrode blank to a profile complementary to the desired tool aperture, such machining employing a cutting tool which during the machining operation traverses in the general plane of the electrode, i.e., at right-angles to the direction in which the electrode enters the extrusion tool blank during a subsequent spark erosion step to produce an apertured tool blank, and thereafter finishing the side wall of the aperture by forcing an abrasive compound through the tool.

The result of machining the electrode by traversing the cutting tool in the plane of the latter results in tool marks at right-angles to the electrode feed direction during spark erosion, with the result that such tool marks are not reproduced in the eroded aperture. The abrasive finishing of the spark-eroded aperture not only provides a very fine surface finish but also does not introduce imperfections, the result being an extrusion tool with an accurate and well-finished opening which is not only far better than can be achieved by conventional techniques but which can also be manufactured more quickly and employing relatively unskilled labour at least in the final finishing process.

It will be appreciated that for maximum accuracy of the tool opening as much as possible of the profile of the electrode should be machined in the described manner, preferably employing a milling machine with the full depth of the electrode machined in one pass employing an appropriate side milling cutter. Internal corners and sharp radii on the electrode may have to be hand filed, but to obtain the maximum benefit from the invention such hand work should be kept to the absolute minimum. During machining of the electrode it is desirably attached to a backing plate which may be located on the milling machine table by means of an electro-magnetic chuck and an angular table may be employed to provide accurate angles for the electrode profile.

The extremely fine finish provided by the abrasive finishing step is reflected in the surface obtained on subsequent extrusions, and in fact normal production tools can be supplied with a finish better than the "super-fine" finish which is at present requested by some extruders for special extrusion work and which conventionally materially increases finishing time with resulting increased production cost.

The final abrasive finishing of the tool opening may be in accordance with the method of and employing the means described in the specification of my U.S. Pat. Ser. No. 3,699,725 and the abrasive compound forced through the opening is desirably a solid wax suspension of abrasive particles. The compound may comprise particles of an abrasive such as silicon carbide in a wax base, and excellent results have been achieved using silicon carbide of 150 grit size in a base consisting of a mixture of plasticized petroleum wax with a penetration hardness in the range of 30 – 35 on the Institute of Petroleum "Penetration of Waxes" scale I.P.41.

In general it is preferred to use a wax which is not softer than a penetration hardness of 45. Harder waxes may be used, and also finer abrasive say up to 1000 grit size when a super finish is required. It has been found that when the aperture consists more of restricted areas, i.e. has narrow area portions, the use of a less hard wax is indicated.

When a wax base abrasive compound is used, after finishing the aperture may be cleaned out to remove the remaining traces of wax by immersion in hot water followed by passing a cleaning cloth through the opening. However, in some circumstances the use of an abrasive of liquid or paste-like form may be found desirable. The abrasion process is continued until the desired finish is achieved, and as the abraded finish is uniform around the opening the accuracy of the preformed shape resulting from the initial electrode machining step is not affected. During the abrasive finishing the tool is preferably mounted in a toolholder positioned at one end of a cylinder containing a ram which forces the abrasive compound through the tool in a manner which simulates the extrusion process for which the tool is designed, and different grades of abrasive compound may be used to provide successive coarse and fine finishing.

Between successive abrasive finishing steps, using progressively finer grit sizes, the wall of the opening is desirably draw polished by hand on flat areas and in a direction at right-angles to the abrasive flow, i.e., across the opening. Such draw polishing, for example using emery cloth, polishes out any abraded lines which may have been formed through the opening in the preceding abrasive step. As an aid to simulating the actual metal extrusion process the abrasive wax compound is preferably forced through without a backing plate for the die, this enabling the relatively low pressure employed to produce a die deflection as in the metal extrusion process when a backing plate will be present.

An advantage of using a solid wax base abrasive, additional to the excellent results which have been achieved with such an abrasive, is that the wax leaves the tool opening with a form simulating the cross-section which will be achieved in the metal extrusion process in which the tool is to be employed. Thus most of the necessary correction of the opening can be effected by the tool manufacturer before the tool is supplied to the customer (i.e., the extruder), which is an important advantage as the tool correction normally carried out by the customer during gests with the actual extrusion machine can be very materially reduced, and in some cases possibly eliminated altogether.

An extrusion tool opening is designed to be manufactured with parallel sides, and the speed of metal flow through the opening at any one point depends upon the "choke" or "relief" of the corresponding region of the opening. Choke is provided when the side walls of the opening taper towards each other in the extrusion direction, and relief is provided when they taper in the opposite direction. In order to correct a finished tool to provide a uniform metal flow during extrusion appropriate portions of the opening are during the foregoing tests provided with choke or relief as necessary, but during the actual tool manufacture the provision of a parallel opening is a desideratum.

One inherent disadvantage of the spark erosion technique is that it tends to provide a slightly choked opening, and it has been found that the abrasive finishing of the present invention tends to correct this error, i.e., to abrade the opening wall differentially so that the opening tends to become more parallel. This is a further advantage provided by the invention, and this correction tends to be achieved whatever the direction in which the opening walls taper. Thus the abrasive finishing has a corrective action with respect to either choke or relief in respect of the direction of which the abrasive is forced through the tool.

The spark erosion leaves a surface hardness of the opening which does not allow conventional hand finishing, and hence up to now it has been necessary to heat treat the tool to provide the desired general tool hardness before hand finishing, the heat treatment resulting in decreased hardness around the opening itself as compared with that left by the spark erosion. The abrasive finishing of the present invention can, however, be employed with the surface hardness left by the spark erosion and thus it is possible to perform the abrasive finishing step after spark erosion but before heat treatment, after the latter only cleaning out of the opening being necessary. This facilitates the smooth flow of production as the abrasive finishing can be carried out as the tools are manufactured before heat treatment, rather than a large batch of heat treated tools being ready for and requiring finishing at the same time. The abrasive step may also be divided into two portions, a main portion after spark erosion and before heat treatment and a fine-finishing portion carried out after heat treatment and serving to clean out the heat treated opening.

As the abrasive finishing is operative with a surface hardness greater than that which can be finished by hand, it is possible to provide a tool with an opening wall harder than that obtainable by normal methods. Thus the heat treatment step may in certain cases be carried out before spark erosion, so that the eroded opening is provided in a pre-hardened tool blank. Thus the final abrasive finishing provides a harder wall surface than that conventionally obtainable and subsequent heat treatment is not necessary, again the additional advantage of smoother production flow being obtained.

The invention also enables openings to be formed and finished in materials which are too hard for normal hand finishing, as will be appreciated from the foregoing. This may be particularly desirable with "comparable" metal components, other than extrusion tools, as referred to earlier herein and to which the invention also relates.

DESCRIPTION OF THE PREFERRED EMBODIMENT

The manufacture of a typical extrusion tool in accordance with the invention will now be described by way of example. The shape of the desired tool opening is first marked out on the surface of a copper plate which is roughly cut to provide an electrode blank. This blank is attached by solder to the surface of a heated steel plate, after the plate and solder have cooled the plate being mounted on an electro-magnetic chucking table on the machine table of a milling machine. The profile of the electrode is accurately finished by a vertical side milling cutter in the milling machine, this machining step being carried out in a single pass with the complete depth of the electrode blank machined, the tip of the cutter reaching into the solder.

When as much as possible of the electrode profile has been milled in this manner the plate is heated to melt the solder, allowing the electrode blank to be removed after which any necessary portions of the profile which cannot satisfactorily be milled are hand finished. A circular tool blank is mounted in a spark erosion machine, the finished electrode being mounted in that machine and passed through the tool to preform the tool aperture in the usual manner. The tool blank with the spark eroded opening is then heat treated to provide the desired tool hardness. After spark erosion the wall of the opening has a finish of 140 – 160 micro-inch.

After heat treatment the tool blank is mounted in a toolholder at one end of a cylinder associated with a hydraulic ram. With the ram retracted a cylindrical billet of a wax base abrasive (150 grit silicon carbide in wax of penetration hardness of 45) is loaded into the cylinder, a forward stroke of the ram forcing the abrasive through the tool opening to finish the side wall of the latter. The ram is then retracted, and if necessary one or more further billets of the same wax abrasive are forced through the opening until the finish appropriate to the grit size used is obtained.

The opening is now draw polished by hand across the opening, i.e. at right-angles to any abrasion marks left by the wax abrasive, using a 200 – 220 grit emery cloth. One or more billets of wax abrasive are now passed through to finish the opening, using 300 – 600 grit size according to the finish desired.

If desired the last-mentioned abrasing step may be split up into a plurality of such steps using progressively finer grit and alternating with draw polishing using progressively finer emery cloth. For example, two wax abrasive steps respectively employing grit sizes of 400 and 600. For a super finish a final abrasive step may employ 1000 grit size.

The finished tool is removed from the holder and the wax plug remaining in the opening pushed out. Remaining traces of wax are removed by immersing the tool in hot water after which the opening is cleaned out by passing a cloth through the opening.

During the early abrading steps the shape of the extruded wax is examined and any necessary correction of the tool opening effected by hand filing.

I claim:

1. A method of manufacturing an extrusion tool, comprising the steps of forming a spark erosion electrode by machining an electrode blank to a profile complementary to the desired tool aperture, such machining employing a cutting tool which during the machining operation traverses in the general plane of the electrode, spark eroding an extrusion tool blank with the spark erosion electrode entering the extrusion tool blank in a direction at right angles to said electrode plane to produce an apertured tool blank, and thereafter finishing the side wall of the aperture in the tool blank by forcing an abrasive compound through the aperture.

2. A method of manufacturing an apertured metal component, comprising the steps of forming a spark erosion electrode by machining an electrode blank to a profile complementary to the desired component aperture, such machining employing a cutting tool which during the machining operation traverses in a direction transverse to an electrode axis at right angles to the plane of said complementary profile, spark eroding a metal component blank with the spark erosion electrode entering the blank in the direction of said electrode axis to produce an apertured component blank, and thereafter finishing the side wall of the aperture in the component blank by forcing an abrasive compound through the aperture.

3. A method according to claim 1, wherein the electrode is machined in a milling machine with the full depth of the electrode machined in one pass of a side milling cutter.

4. A method according to claim 1, wherein during machining the electrode is temporarily attached to a backing plate.

5. A method according to claim 4, wherein the electrode is attached to the backing plate by solder.

6. A method according to claim 1, wherein said abrasive compound is a solid wax suspension of abrasive particles.

7. A method according to claim 6, wherein the wax base of said compound has a penetration hardness of not more than 45.

8. A method according to claim 7, wherein the penetration hardness of the wax lies in the range of 30 – 35.

9. A method according to claim 6, wherein the abrading step using a wax base abrasive is one of a plurality of such steps employing abrasive particles of progressively increasing grit sizes.

10. A method according to claim 9, wherein between said abrading steps the wall of the opening is draw polished by hand in a direction across the opening, i.e., at right-angles to the abrasion direction.

11. A method according to claim 9, wherein the initial abrading step employs silicon carbide with a grit size of 150, and the final abrading step employs a grit size of between 600 and 1000.

12. A method according to claim 9, wherein at least one abrading step is effected prior to heat treatment of the spark eroded tool blank and at least one abrading step is effected after such heat treatment.

13. A method according to claim 6, wherein the wax base abrasive compound is forced through the tool opening in a manner which simulates the normal extrusion process for which the tool is designed.

14. A method according to claim 13, wherein the extruded shape of the wax compound leaving the tool opening is examined and any necessary correction of the opening effected by hand.

* * * * *